(12) United States Patent
Rince et al.

(10) Patent No.: US 10,890,598 B2
(45) Date of Patent: Jan. 12, 2021

(54) COMPANION CHIP SHORT CIRCUIT IMMUNITY

(71) Applicant: NXP USA, Inc., Austin, TX (US)

(72) Inventors: Jean-Christophe Patrick Rince, Roques (FR); Sebastien Abaziou, Tournefeuille (FR); Benoit Alcouffe, Tournefeuille (FR)

(73) Assignee: NXP USA, Inc., Austin, TX (US)

( * ) Notice: Subject to any disclaimer, the term of this patent is extended or adjusted under 35 U.S.C. 154(b) by 75 days.

(21) Appl. No.: 16/276,960

(22) Filed: Feb. 15, 2019

(65) Prior Publication Data

US 2020/0217870 A1   Jul. 9, 2020

(30) Foreign Application Priority Data

Jan. 9, 2019   (EP) .................................... 19305029

(51) Int. Cl.
   *G01P 3/48*     (2006.01)
   *G01P 3/489*    (2006.01)

(52) U.S. Cl.
   CPC ............ *G01P 3/4802* (2013.01); *G01P 3/489* (2013.01)

(58) Field of Classification Search
   CPC ............................... G01P 3/4802; G01P 3/489
   See application file for complete search history.

(56) References Cited

U.S. PATENT DOCUMENTS

| | | | |
|---|---|---|---|
| 5,404,304 A | 4/1995 | Wise et al. | |
| 5,406,485 A | 4/1995 | Wise et al. | |
| 5,493,214 A * | 2/1996 | Good | G01D 3/08 324/173 |
| 6,282,954 B1 | 9/2001 | Ott et al. | |
| 6,491,357 B2 | 12/2002 | Holst | |

(Continued)

FOREIGN PATENT DOCUMENTS

| | | |
|---|---|---|
| DE | 19602243 A1 | 10/1997 |
| DE | 19635440 A1 | 3/1998 |
| WO | 99/01774 | 1/1999 |

OTHER PUBLICATIONS

Abaziou, Sebastian, Benoit Alcouffe, and Jean-Christophe Rince; "Resistive Short Circuit Immunity for Wheel Speed Sensor Interface on Braking System"; U.S. Appl. No. 16/055,554, filed Aug. 6, 2018; consisting of 23 pages of Specification and 5 pages of drawings.

(Continued)

*Primary Examiner* — Clayton E. LaBalle
*Assistant Examiner* — Michael A Harrison (57) ABSTRACT

A method and apparatus for resistive short circuit immunity for wheel speed sensor interface on braking system. In one embodiment the apparatus includes a first circuit for transmitting a first current to a wheel speed sensor, and a second circuit for receiving a second current from the wheel speed sensor. Another circuit is coupled to the first and second circuits and configured to detect and respond to a near zero resistive short between the wheel speed sensor and ground. In this embodiment the circuit is configured to detect the near zero resistive short based on a direct or indirect comparison between magnitudes of the first and second currents to a first predetermined value, and based on a direct or indirect comparison between magnitudes of the first and second currents to a second predetermined value.

18 Claims, 9 Drawing Sheets

(56) References Cited

U.S. PATENT DOCUMENTS

| | | | |
|---|---|---|---|
| 7,520,573 | B2 | 4/2009 | Carpenter et al. |
| 8,154,837 | B2 | 4/2012 | Trapp et al. |
| 9,664,241 | B2 | 5/2017 | Wakao |
| 2003/0226702 | A1 | 12/2003 | Imai et al. |
| 2016/0154047 | A1 | 6/2016 | Alcouffe et al. |
| 2017/0299625 | A1 | 10/2017 | Park |
| 2017/0355266 | A1 | 12/2017 | Inoue et al. |

OTHER PUBLICATIONS

Ex Parte Quayle for U.S. Appl. No. 16/055,554; mailed Feb. 14, 2019; 10 pages.
Notice of Allowance for U.S. Appl. No. 16/055,554 dated Jun. 11, 2019, 20 pages.

* cited by examiner

COMPANION CHIP SHORT CIRCUIT IMMUNITY

RELATED APPLICATIONS

This application is related to U.S. patent application Ser. No. 16/055,554, entitled "Resistive Short Circuit Immunity for Wheel Speed Sensor Interface on Braking System," which was filed Aug. 6, 2018 and is incorporated herein by reference in its entirety.

BACKGROUND

Sensors detect events or quantities, and provide output signals indicative thereof. In automobiles, bicycles and other vehicles, wheel speed sensors output signals indicative of wheel speed. These output signals can be used by control systems such as an anti-lock brake system (ABS).

Active wheel speed sensors are commonly used in newer vehicles for various reasons. Some active wheel speed sensors (hereinafter type I active wheel speed sensors) output a square wave current signal, the frequency of which is determined by the rotational speed of an associated wheel. The magnitude of signals produced by other types of active wheel speed sensors may vary depending on whether its associated wheel is rotating in a forward or reverse direction. Yet other types of active wheel speed sensors output pulse-width modulated signals in which additional information such as direction of rotation and magnetic field strength are coded. The output of still other types of active wheel speed sensors are encoded with diagnostic data. The present technology will be described with reference to type I active wheel speed sensors employed in motorized vehicles, it being understood the present technology should not be limited thereto.

U.S. patent application Ser. No. 16/055,554 describes an example ABS that employs wheel speed sensors. The application describes interface circuits connected between wheel speed sensors (WSS) and an ABS controller. Each interface circuit decodes a square wave output signal of a WSS to produce rotational information for subsequent processing by the ABS controller. The ABS controller performs several functions such as monitoring rotational speed of all wheels of the vehicle. If the speed from one wheel changes abruptly with respect to the speed of other wheels, the ABS controller understands that wheel is beginning to lose traction. It can take appropriate action such as applying the brakes or performing traction control.

BRIEF DESCRIPTION OF THE DRAWINGS

The present technology may be better understood, and its numerous objects, features, and advantages made apparent to those skilled in the art by referencing the accompanying drawings.

The use of the same reference symbols in different drawings indicates similar or identical items unless otherwise noted. The Figures are not necessarily drawn to scale.

DETAILED DESCRIPTION

Figure 1:
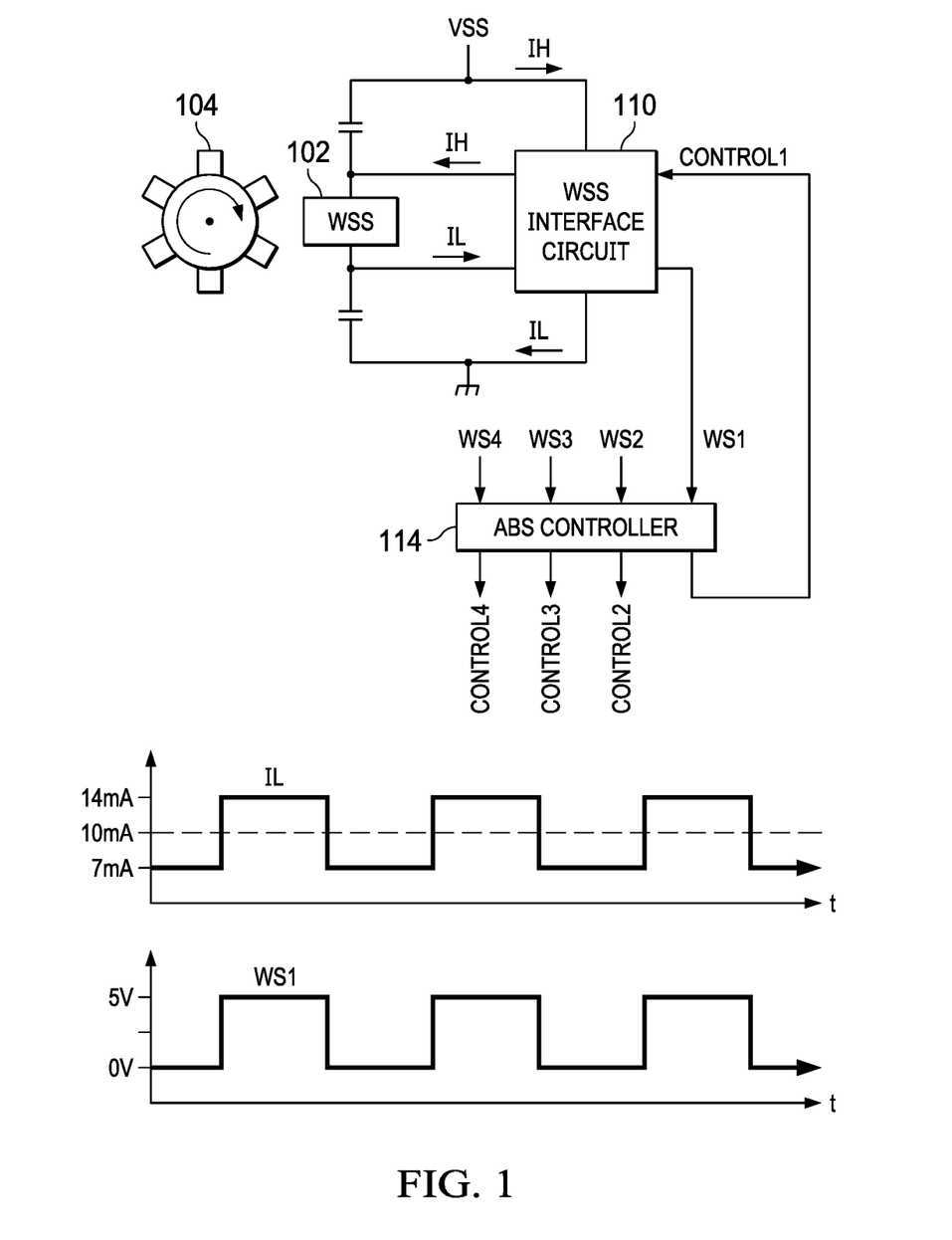
FIG. 1 illustrates relevant components of an example ABS and operational aspects thereof.

FIG. 1 illustrates relevant components of an example ABS 100 that includes a WSS 102 that is closely positioned to a gear-shaped rotor (also known as a tone wheel) 104, which in turn is attached directly or indirectly to a wheel of a motor vehicle (not shown). FIG. 1 also shows a WSS interface circuit 110 coupled to WSS 102 and controlled by ABS controller 114. Although not shown within FIG. 1, a separate rotor, WSS and interface circuit is provided for each wheel of the motor vehicle. The ABS controller 114 may take form in a microcontroller or system-on-a-chip that includes one or more central processing units, each of which is capable of executing instructions stored in memory. ABS controller 114 performs various functions in response to executing the instructions.

Equally spaced teeth are positioned on the circumference of rotor 104, which spins at a speed that matches the rotational speed of the wheel to which it is attached. WSS 102 draws current IH from a voltage supply Vss provided by a battery (not shown) via interface circuit 110. WSS 102 returns current IL to ground via interface circuit 110. Normally IL=IH.

FIG. 1 shows a square wave that represents IL as rotor 104 spins. Each pulse of IL shown in FIG. 1 represents a tooth passing WSS 102. In the illustrated example IL varies between 14 mA and 7 mA. The frequency of pulses is directly proportional to wheel speed since rotor 104, which is directly or indirectly attached to the wheel. As the rotation speed of rotor 104 increases, the frequency of pulses increases, thereby indicating faster wheel speed. The frequency of pulses can be used to determine wheel speed.

Interface circuit 110 decodes IL or IH to produce an output voltage signal WS1 that can be understood by ABS controller 114. Normally interface circuit 110 decodes IL. However, interface circuit 110 will decode IH if interface circuit 110 determines that IL is greater in magnitude than IH. U.S. patent application Ser. No. 16/055,554 describes at least one situation in which IL will be greater in magnitude.

Assuming IL is not greater than IH, interface circuit 110 decodes IL by directly or indirectly comparing IL to a threshold value X (e.g., 10 mA). More particularly, interface circuit 110 outputs WS1=5V when IL exceeds threshold value X=10 mA, and interface circuit 110 outputs WS1=0V when IL falls below threshold X=10 mA. If IL exceeds IH by a predetermined amount, however, interface circuit 110 decodes IH, not IL, in similar fashion; interface circuit 110 outputs WS1=5V when IH exceeds threshold value X=10 mA, and interface circuit 110 outputs WS1=0V when IH falls below threshold value X=10 mA.

Interface circuit 110 decodes IL to produce WS1 shown in FIG. 1. Like IL, WS1 is a square wave that normally switches between 5V and 0V as IL switches between 7 mA and 14 mA. The frequency of WS1 matches the frequency of IL, which in turn depends on the rotational speed of rotor 104. WS1 is provided to ABS controller 114 as wheel speed information. ABS controller 114 generates traction control signals C1-C4 in response to processing wheel speed signals WS1-WS4, respectively, received from respective interface circuits.

Figure 2:
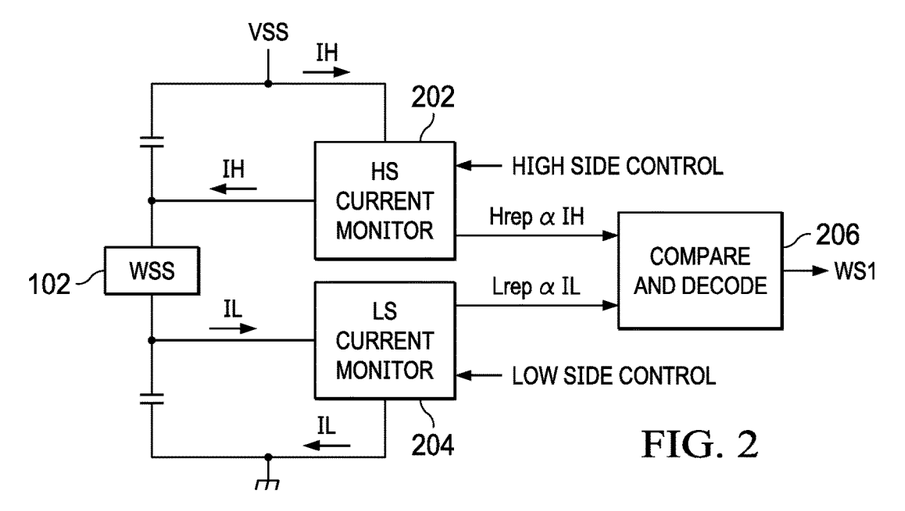
FIG. 2 illustrates an example wheel speed sensor interface circuit employed in FIG. 1.

FIG. 2 illustrates one embodiment of interface circuit 110. As shown this circuit includes a high side current monitor 202 and a low side current monitor 204, each of which can be individually activated by high side control and low side control signals, respectively, from ABS controller 114. High side current monitor 202, when activated, transmits IH to WSS 102 with little or no resistance, and generates a signal Hrep, which is substantially equal to current IH. Low side current monitor 204, when activated, transmits IL to ground with little or no resistance, and generates a signal Lrep that is substantially equal to current IL. In one embodiment high side current monitor 202 and low side current monitor 204 may include current mirrors that generate Hrep and Lrep based on IH and IL, respectively. In an alternative embodiment Hrep and Lrep can be voltage signals that are proportional to IH and IL, respectively. For purposes of explanation only, the remaining description will presume that Hrep=IH and Lrep=IL.

FIG. 2 shows a compare and decode (CD) circuit 206 that receives and compares Lrep and Hrep. If CD circuit 206 determines that Lrep exceeds Hrep by a predetermined value, then CD circuit 206 decodes Hrep to produce WS1 as described above. Otherwise CD circuit 206 decodes Lrep as described above.

Figure 3:
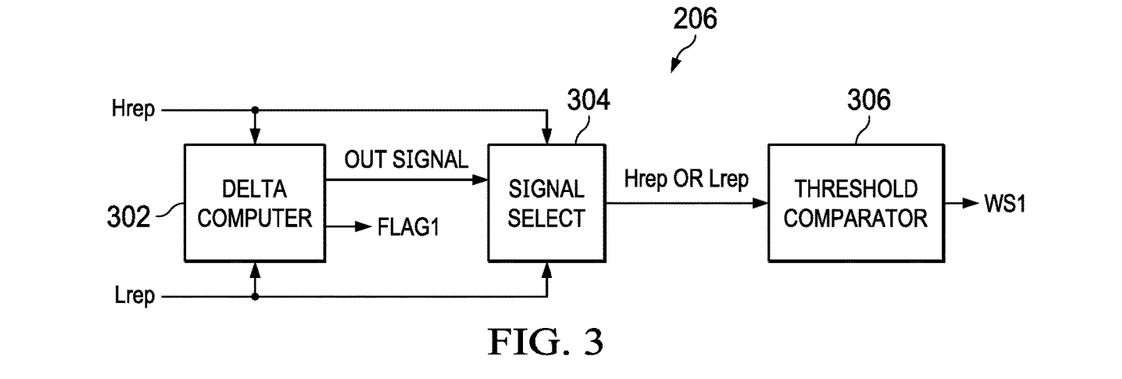
FIG. 3 illustrates an example compare and decode circuit employed in FIG. 2.

FIG. 3 illustrates one example CD circuit 206. A delta compare circuit 302 and signal select circuit 304 receive Hrep and Lrep. Delta compare circuit 302 asserts its output signal when Lrep−Hrep>Y, where Y is a predetermined value (e.g., 0 A, 0.5 mA, 1 mA, etc.). Signal selector circuit 304 selects Hrep for decoding when delta comparator circuit 302 asserts its output. Otherwise signal selector circuit 304 selects Lrep for decoding. Threshold detector circuit 306 compares its input signal (i.e., Hrep or Lrep) to threshold value X. Threshold detector circuit 306 asserts its output signal (i.e. WS1=5V), when its input signal exceeds threshold value X, and threshold detector circuit 306 deasserts its output signal (i.e., WS1=0V) when its input signal falls below threshold value X.

Figure 4:
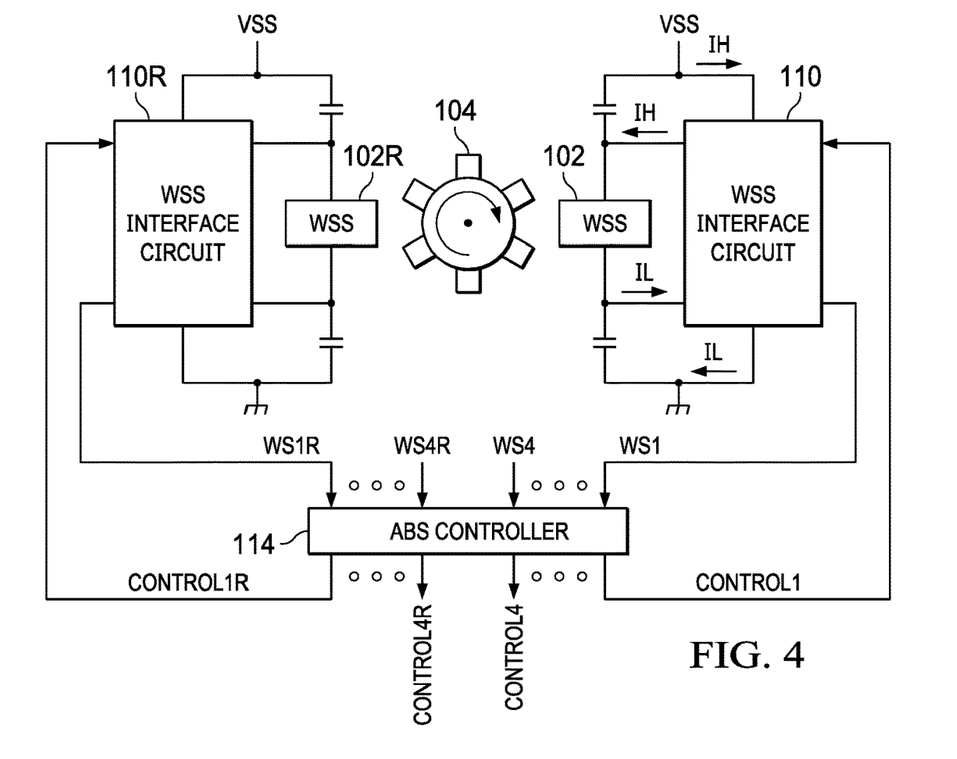
FIG. 4 illustrates the ABS shown in FIG. 1 with redundant wheel speed sensors and interface circuits added thereto.

For safety reasons vehicles are being equipped with redundant wheel speed sensors and interface circuits. If a primary wheel speed sensor or its interface circuit fails in whole or in part, the primary interface circuit will be unable to provide ABS controller 114 with an accurate wheel speed signal. If the ABS controller detects a failure in the primary wheel speed sensor or its interface circuit, the ABS controller can activate the redundant interface circuit to provide the needed wheel speed signal to ABS controller 114. FIG. 4 illustrates the ABS 100 shown in FIG. 1 with redundant wheel speed sensors and interface circuits added thereto. For ease of illustration, only redundant wheel speed sensor 102R and redundant interface circuit 110R are shown. Redundant WSS 102R is substantially identical to WSS 102 described above, and redundant interface circuit 110R is substantially identical to interface circuit 110 described above.

Figure 5:
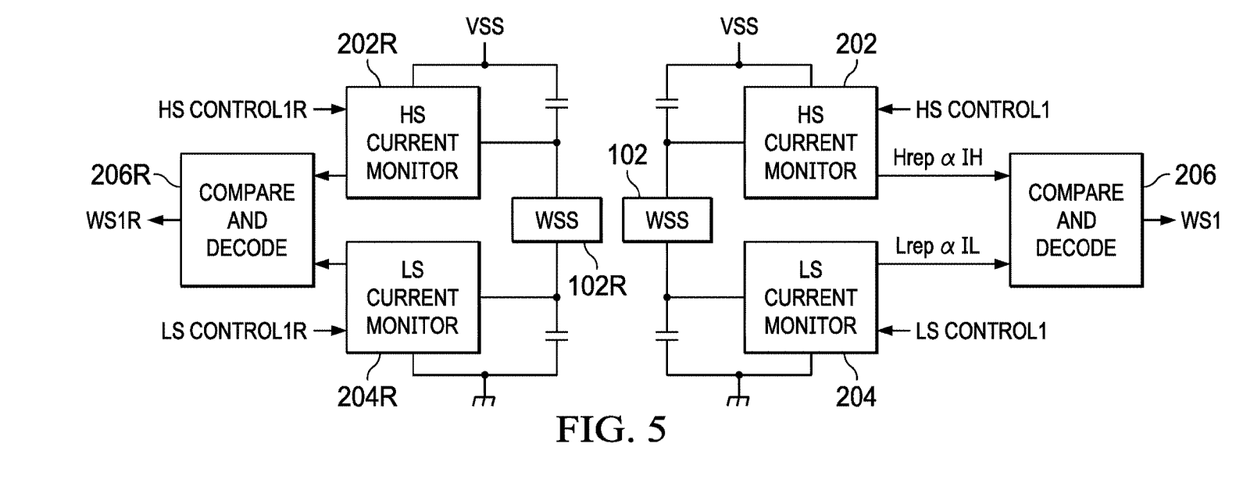
FIG. 5 illustrates relevant components of an example interface circuit and an example redundant interface circuit employed in FIG. 4.

FIG. 5 illustrates relevant components of interface circuit 110 and redundant interface circuit 110R of FIG. 4. Any one of CD circuit 206, high side monitor 202 and low side monitor 204 can fail, thereby rendering interface circuit 110 inoperable. If interface circuit 110 fails, ABS controller 114 can activate interface circuit 110R to generate redundant signal WS1R. However, as will be more fully described below it may be imperative that ABS controller 114 fully deactivates interface circuit 110.

Figure 6:
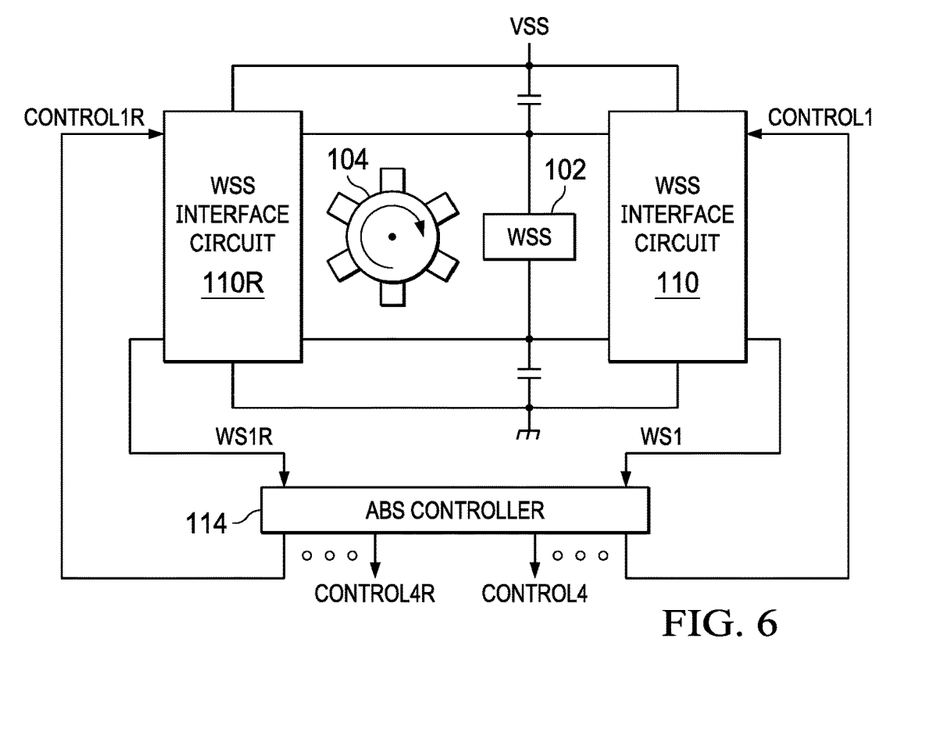
FIG. 6 is the ABS system shown in FIG. 4 without redundant wheel speed sensors.
Figure 7:
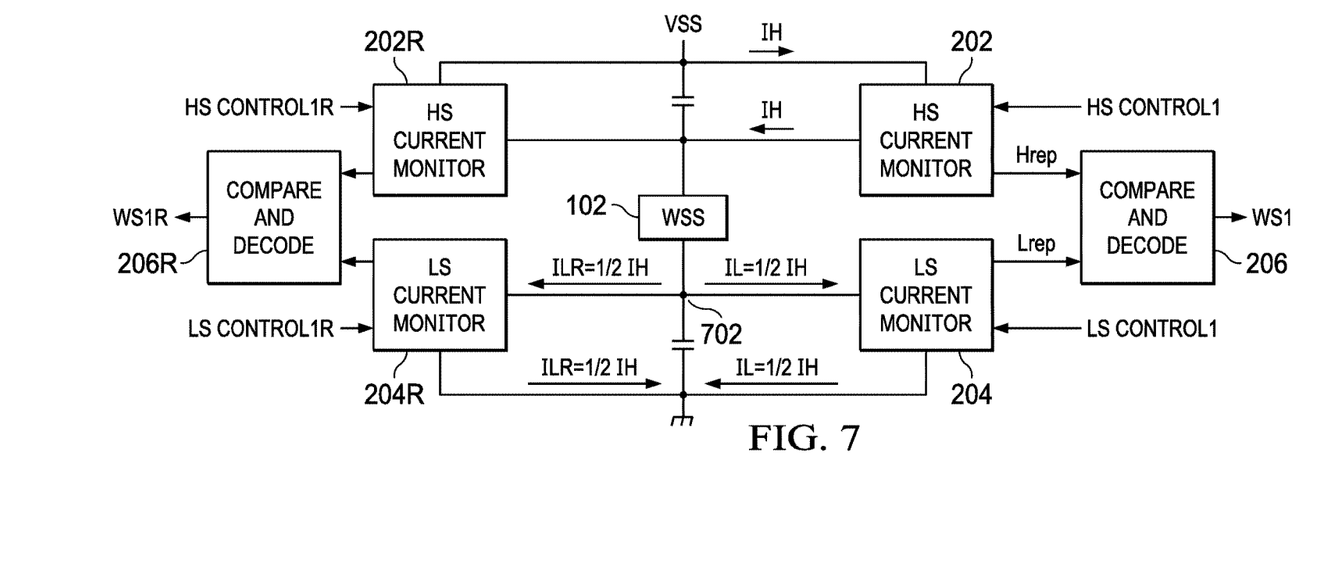
FIG. 7 shows relevant connections of current monitors to a wheel speed sensor.

The cost of the ABS system shown in FIG. 4 can be reduced if the redundant set of wheel speed sensors WSSRs are eliminated. FIG. 6 is the ABS system shown in FIG. 4 without redundant wheel speed sensors WSS 102R. FIG. 7 shows the relevant connections of the current monitors to WSS 102. ABS controller 114 can individually activate or deactivate any one of the current monitors or CD circuits in FIG. 7. For example ABS controller can deactivate the feature CD circuit 206 that compares Hrep and Lrep so that CD circuit 206 always decodes Lrep to produce WS1. Or ABS controller 114 can deactivate current monitor 202 and/or current monitor 204. When deactivated a current monitor does not transmit current to or from WSS 102.

Redundant interface circuit 110R in general, and low side current monitor 204R in particular should be deactivated if interface circuit 110 is operating properly. However if ABS controller 114 inadvertently activates low side current monitor 204R while interface circuit 110 is active, ABS controller 306 may receive an inaccurate wheel speed signal WS1. To illustrate, FIG. 7 shows high side current monitor 202 and low side current monitor 204 activated by ABS controller 114. FIG. 7 also shows that redundant low side current monitor 204R is inadvertently activated by ABS controller 114 and conducts current from WSS 102 to ground. Each of low side current monitors 204 and 204R have very little or no resistance to ground when activated. Thus, current flow through WSS 102 will be divided equally at node 702, with one half flowing to ground via activated low side current monitor 204, and one half flowing to ground via inadvertently activated low side current monitor 204R.

Figure 8:
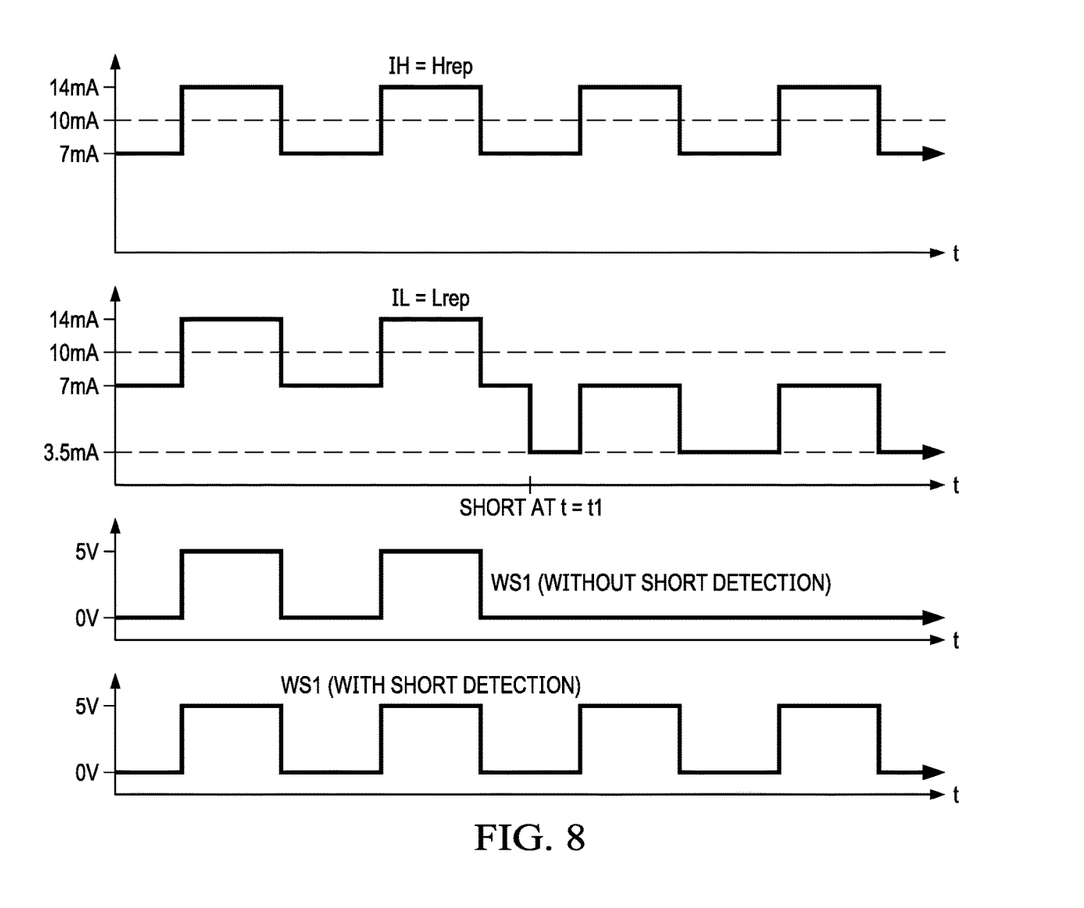
FIG. 8 illustrates relevant signals.

FIG. 8 illustrates IH and IL. At time t=t1 ABS 114 inadvertently activates redundant low side current monitor 204R. As can be seen in FIG. 8, signal IL, and thus Lrep, falls below and stays below threshold value X=10.0 mA as rotor 106 rotates. As set forth above, CD circuit 206 decodes Lrep to produce WS1, unless Lrep is greater Hrep as noted above. In FIG. 8 IL and Lrep remain below 10 mA after time t=t1. And because of this, CD circuit 206 produces a constant WS1=0V in error beginning at time t=t1.

Figure 9:
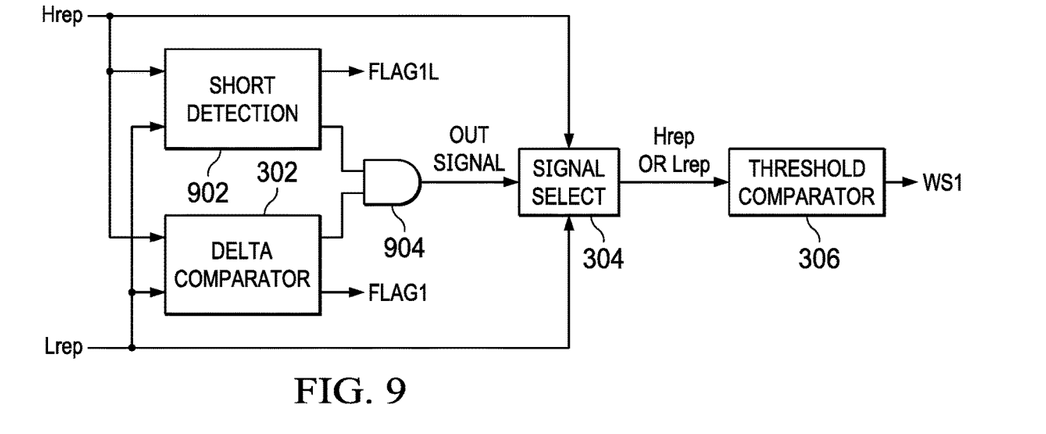
FIG. 9 illustrates the comparing decode circuit shown in FIG. 3 with a short detection circuit added thereto.

The foregoing problem can be addressed by adding a short detection circuit. FIG. 9 illustrates the CD circuit 206 shown in FIG. 3 with short detection circuit 902 added thereto. The short detection circuit 902 can detect a short created between WSS 102 and ground via, for example, inadvertently activated low side current monitor 204R. In general, the short detection circuit 902 can detect the short in question in response to detecting a sudden drop in Lrep while Hrep is constant.

The output of delta comparator 302 and short detection circuit 902 are provided as inputs to AND gate 904. The output of AND gate 904 is provided to signal select circuit 304. Threshold compare circuit 306 will decode Lrep only when both short detection circuit 902 and delta comparator 302 assert their outputs. Otherwise, threshold compare circuit 306 will decode Hrep to produce WS1. It is noted that delta comparator 302 and short detection circuit 902 provide Flag1 and Flag1L, respectively, to ABS controller 114. Flag1 is described in U.S. patent application Ser. No. 16/055,554. Flag1L, when asserted, indicates the existence of the short created by, for example, inadvertently activated current monitor 204R. ABS controller 114 may respond to an assertion of Flag1L by deactivating current monitor 204R. It is noted that in in alternative embodiments first and second threshold comparator circuits can be provided that decode Hrep and Lrep, respectively. The output of these two circuits can be provided as inputs to signal select circuit 304. In this alternative embodiment, the output of the signal select circuit 304 is provided to ABS controller 114 as WS1. However, the present technology will be described with reference to embodiment shown in FIG. 9.

Figure 10:
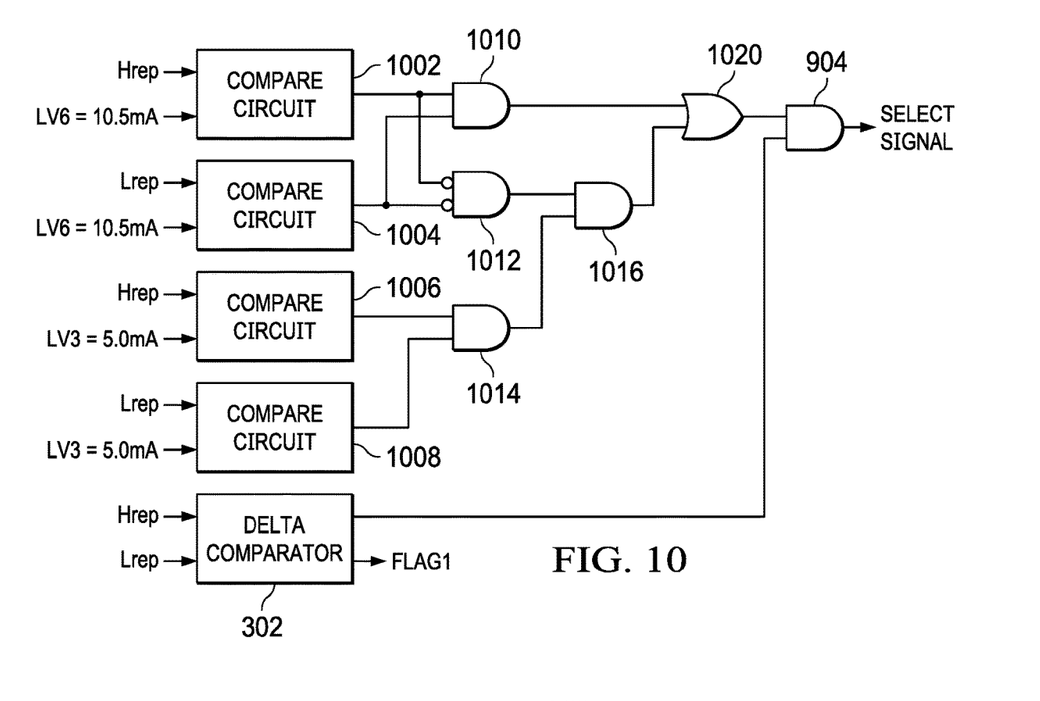
FIG. 10 illustrates a more detailed view of an example short detection circuit employed in FIG. 9.
Figure 16:
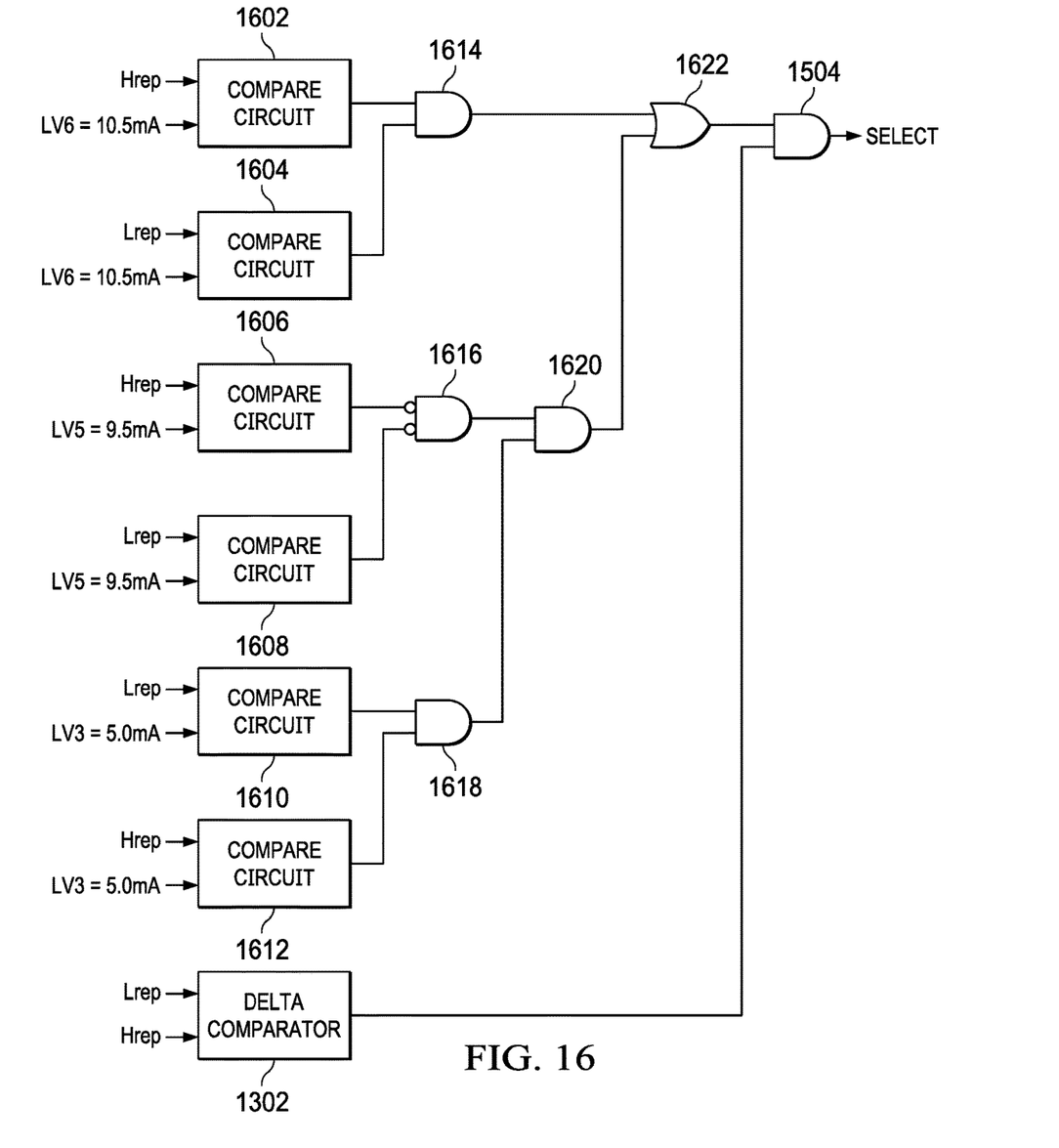
FIG. 16 illustrates a more detailed view of an example short detection circuit employed in FIG. 15.

FIG. 10 illustrates delta comparator 302, AND gate 904, and a more detailed view of an example short detection circuit 902. As shown, short detection circuit 902 includes compare circuits 1002-1008, each of which is configured to compare Hrep or Lrep to predetermined levels LV6 or LV3, which can be selected based upon the magnitudes of current between which Lrep and Hrep normally switch and the threshold value X described above. In one embodiment, LV6 is set to a value above threshold value X. And LV3 is set to a value that is below the magnitude of Hrep and Lrep between pulses. In the illustrated example LV6 and LV3 are set to 10.5 mA and 5.0 mA, respectively. It should be noted that the LVx values used in FIGS. 10 and 16 are examples only. Compare circuit 1002 asserts its output only when Hrep exceeds 10.5 mA, compare circuit 1004 asserts its output only when Lrep exceeds 10.5 mA, compare circuit 1006 asserts its output only when Hrep exceeds 5.0 mA, and compare circuit 1008 asserts its output only one Lrep exceeds 5.0 mA.

The outputs of compare circuits 1002-1008 are provided as inputs to AND gates 1010-1014 as shown. The inputs to AND gate 1012 are inverted. The outputs of AND gates 1012 and 1014 are provided as inputs to AND gate 1016. The outputs of AND gates 1010 and 1016 are provided as inputs to OR gate 1020. The output of OR gate 1020 and delta comparator 302 are provided as inputs to AND gate 904. The delta comparator 302 shown in FIG. 10 operates the same as the delta comparator 302 shown in FIG. 3. Ultimately the output of AND gate 904 is used by signal selector 304 to select Hrep or Lrep for subsequent decoding by threshold comparator 306. When AND gate 904 asserts its output, threshold detector decodes Lrep to produce WS1. Otherwise threshold detector decodes Hrep to produce WS1. FIG. 8 compares the outputs of threshold compare circuits 306 of FIGS. 3 and 9. As can be seen in this Figure, the output of threshold compare circuit 306 of FIG. 9 remains accurate even though ABS controller 114 inadvertently activates redundant low side current monitor 204R at t=t1.

The foregoing describes interface circuits that decode IL to produce WS1, except when IL exceeds IH. In an alternative embodiment, the interface circuits can be configured to decode IH, except when IH exceeds IL. U.S. patent application Ser. No. 16/055,554 describes at least one situation in which IH is greater in magnitude than IL.

Figure 11:
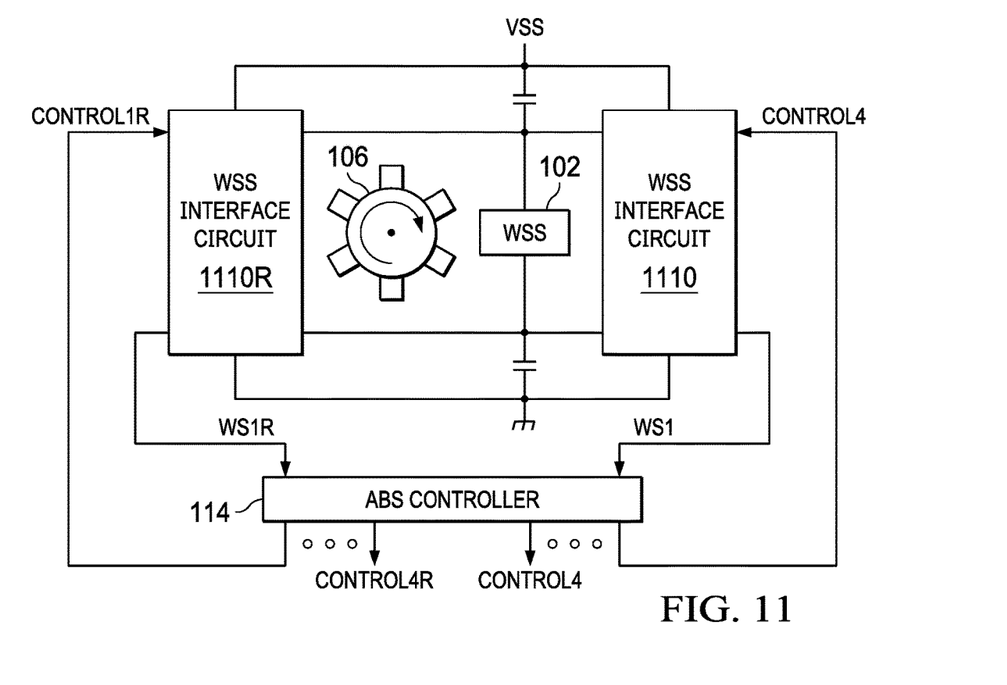
FIG. 11 shows relevant components of an alternative ABS.

FIG. 11 shows the ABS of FIG. 6 with interface circuit 110 replaced by interface circuit 1110, and redundant interface circuit 110R replaced by redundant interface circuit 1110R. These interface circuits are substantially similar, but one major difference is that interface circuit 1110 is configured to decode IH, unless IH exceeds IL. Assuming IH is not greater than IL, interface circuit 1110 decodes IH by directly or indirectly comparing IH to threshold value X (e.g., 10 mA); interface circuit 1110 outputs WS1=5V when IH exceeds threshold value X=10 mA, and interface circuit 1110 outputs WS1=0V when IH falls below threshold X=10 mA. If IH exceeds IL, however, interface circuit 1110 decodes IL, not IH; interface circuit 1110 outputs WS1=5V when IL exceeds threshold value X=10 mA, and interface circuit 1110 outputs WS1=0V when IL falls below threshold value X=10 mA. Redundant interface circuit 1110R operates similarly.

Figure 12:
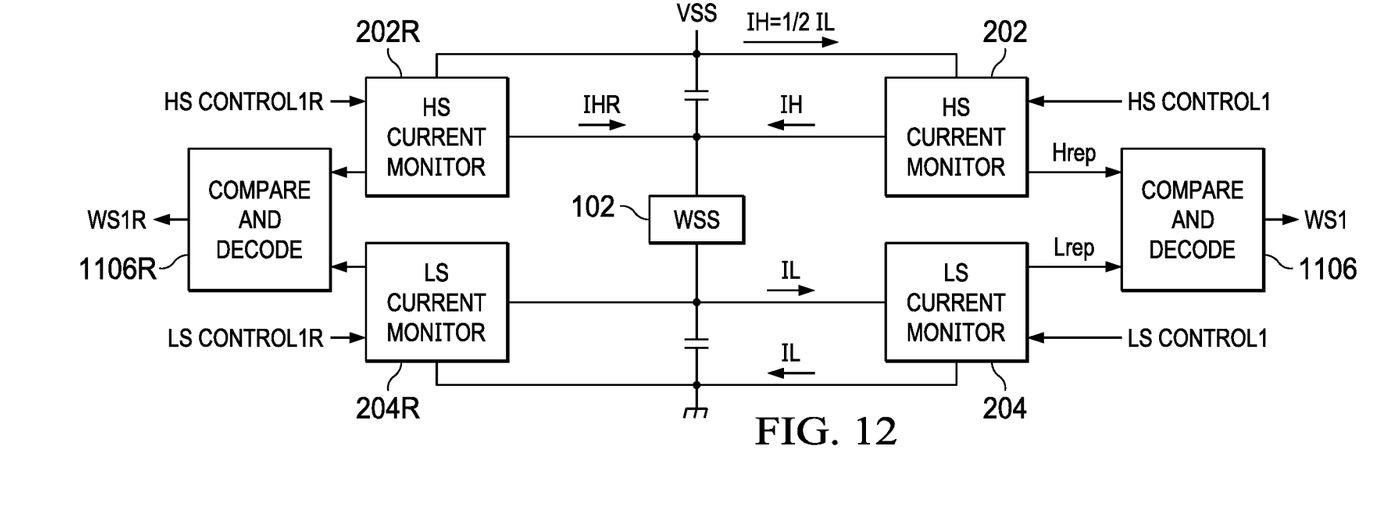
FIG. 12 illustrates relevant components of example interface circuits employed in FIG. 11.

FIG. 12 illustrates relevant components of example interface circuits 1110 and 1110R. Interface circuit 1110 includes the same high side and low side current monitors 202 and 204, respectively, found in interface circuit 110, and interface circuit 1110R includes the same high side and low side current monitors 202R and 204R, respectively, found in redundant interface circuit 110R. CD circuits 1106 and 1106R are substantially different than CD circuits 206 and 206R shown in FIG. 7. CD circuit 1106 normally decodes Hrep, which is substantially equal to IH, unless CD circuit 1106 determines that Hrep exceeds Lrep by a predetermined value. Lrep is substantially equal to IL value. If Hrep exceeds Lrep by the predetermined amount, CD circuit 1106 decodes Lrep to produce WS1. Redundant CD circuit 1106R operates similarly.

Figure 13:
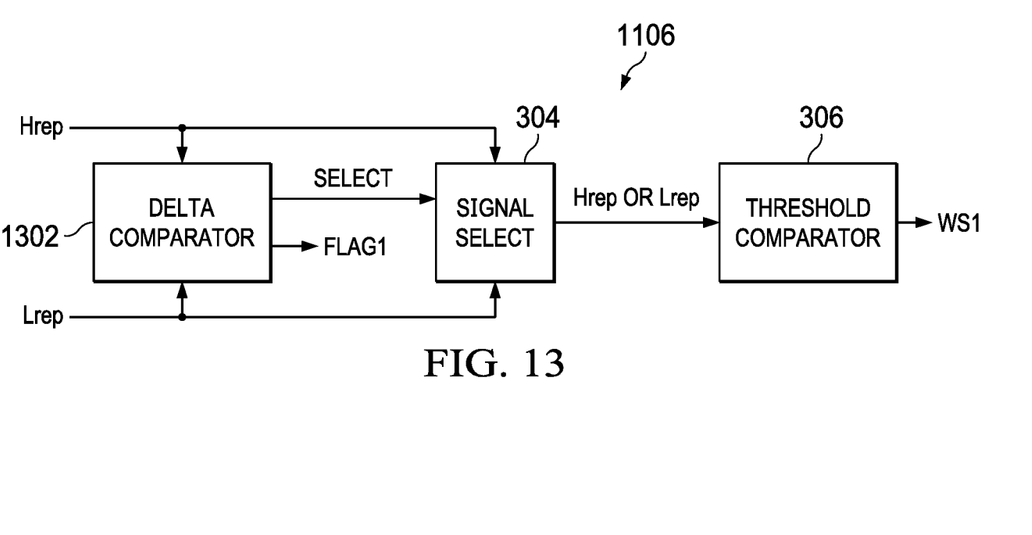
FIG. 13 illustrates relevant components of an example compare and decode circuit employed in FIG. 12

FIG. 13 illustrates relevant components of an example CD circuit 1106. Delta compare circuit 1302 and signal select circuit 304 receive Hrep and Lrep. Delta compare circuit 1302 asserts its output signal when Hrep−Lrep>Y, where Y is a predetermined value (e.g., 0 A, 0.5 mA, 1 mA, etc.). Signal selector circuit 304 selects Lrep for decoding when delta comparator circuit 302 asserts its output. Otherwise signal selector circuit 304 selects Hrep for decoding. Threshold detector circuit 306 decodes by comparing its input signal (i.e., Hrep or Lrep) to threshold value X. Threshold detector circuit 306 asserts its output signal (i.e. WS1=5V), when its input signal exceeds threshold value X, and threshold detector circuit 306 generates WS1=0V when its input signal falls below threshold value X. Although not shown, redundant CD circuit 1106R is similar to that shown in FIG. 13.

Figure 14:
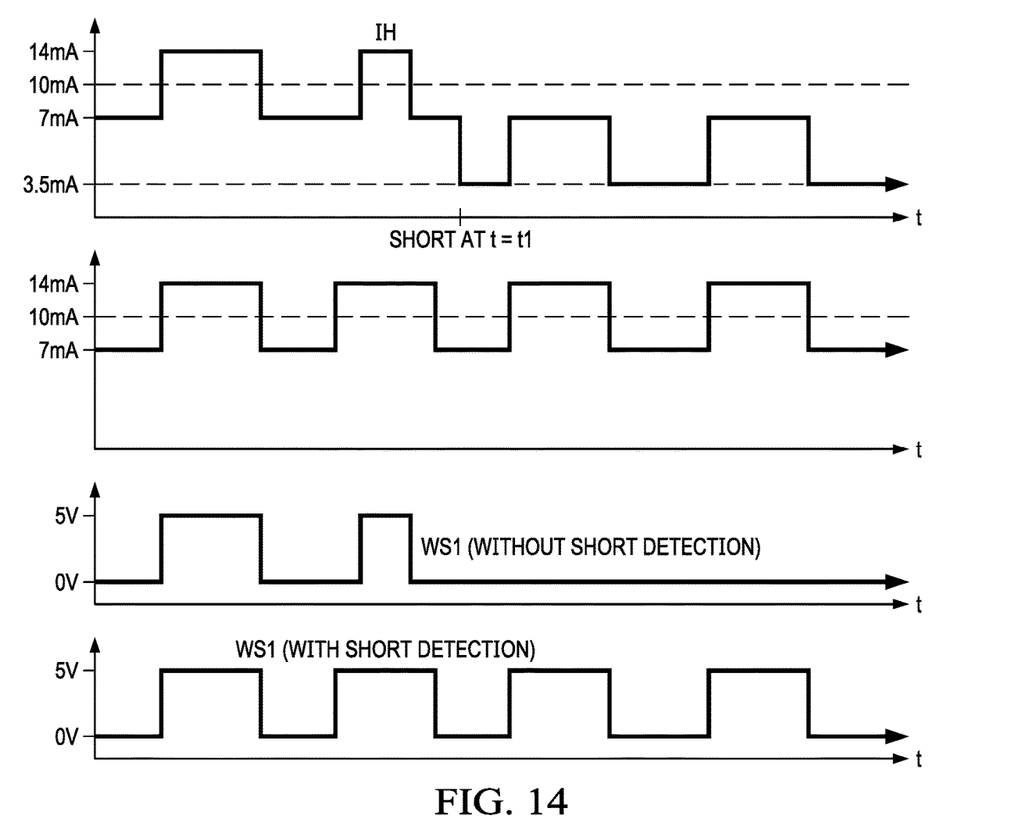
FIG. 14 illustrates relevant signals.

With continued reference to FIGS. 12 and 13, redundant interface circuit 1110R in general, and high side current monitor 202R in particular should remain deactivated if interface circuit 1110 is operating properly. However if ABS controller 114 inadvertently activates redundant high side current monitor 202R while interface circuit 1110 is active, then ABS controller 114 may receive an inaccurate wheel speed signal WS1. To illustrate, FIG. 12 shows high side current monitor 202 and low side current monitor 204 activated by ABS controller 114. FIG. 12 also shows that redundant high side current monitor 202R is inadvertently activated by ABS controller 114. Each of activated high side current monitors 202 and 202R present little or no resistance to WSS 102 when activated; essentially both monitors short Vss to WSS 102. Accordingly high side current monitors 202 and 202R transmit equal amounts of current to WSS 102. FIG. 14 illustrates IH when ABS 114 inadvertently activates redundant high side current monitor 202R at time t=t1. As can be seen in FIG. 14, signal IH, which is presumed equal to Hrep, falls below and stays below threshold value X=10.0 mA as rotor 106 rotates due to activated high side current monitor 202R. As described above CD circuit 1106 decodes Hrep to produce WS1, unless Hrep is greater Lrep as noted above. In FIG. 14 IH and Hrep continuously remain below 10 mA after time t=t1. Because of this, CD circuit 1106 produces a constant WS1=0V in error beginning at time t=t1.

Figure 15:
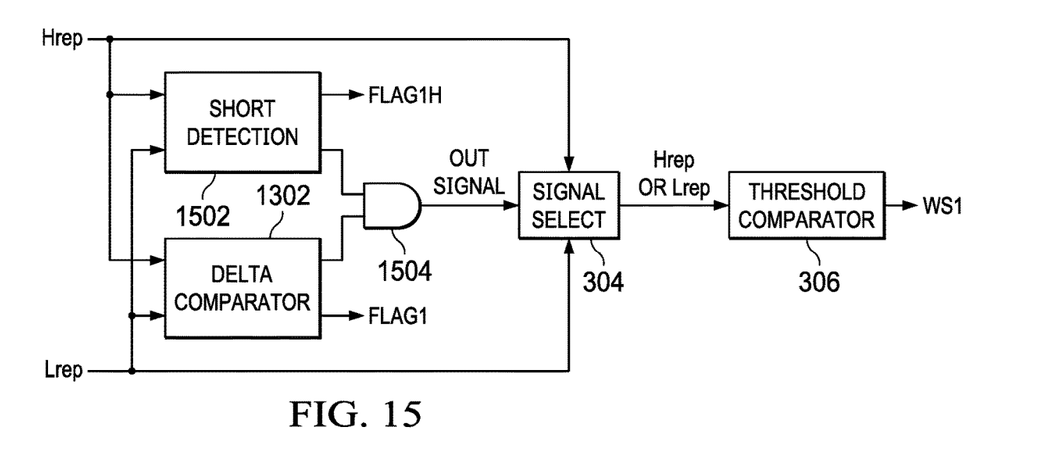
FIG. 15 illustrates the compare and decode circuit of FIG. 13 with a short detection circuit added thereto.

The foregoing problem can be addressed by adding a short detection circuit to the CD circuit 1106 shown in FIG. 13. FIG. 15 illustrates the CD circuit 1106 of FIG. 13 with short detection circuit 1502 added thereto. This short detection circuit can detect a short created between WSS 102 and Vss via, for example, inadvertently activated high side current monitor 202R. In general, the short detection circuit can detect the short in question in response to detecting a sudden drop in Hrep while Lrep is constant. The output of delta comparator 1302 and short detection circuit 1502 are provided as inputs to AND gate 1504. The output of AND gate 1504 is provided to signal select circuit 304 as shown. As a result threshold compare circuit 306 will decode Hrep only when both short detection circuit 1502 and delta comparator 1302 assert their outputs. Otherwise, threshold compare circuit 306 will decode Lrep to produce WS1. It is noted that delta comparator 1302 and short detection circuit 1502 provide Flag1 and Flag1H, respectively, to ABS controller 114. Flag1 is described in U.S. patent application Ser. No. 16/055,554. Flag1H, when asserted, indicates the existence of the short created by, for example, inadvertently activated current monitor 202R. ABS controller 114 may respond to an assertion of Flag1H by deactivating current monitor 202R.

FIG. 16 illustrates delta comparator 1302, AND gate 1504, and a more detailed view of an example short detection circuit 1502. As shown, short detection circuit 1502 includes compare circuits 1602-1612, each of which is configured to compare Hrep or Lrep to predetermined levels LV6, LV5 or LV3. LV6 and LV3 were described above. LV5 is selected to be a value below threshold value X. In the illustrated example are LV6, LV5 and LV3 are set to 10.5 mA, 9.5 mA, and 5.0 mA, respectively. Thus, compare circuit 1602 asserts its output only when Hrep exceeds 10.5 mA, compare circuit 1604 asserts its output only when Lrep exceeds 10.5 mA, compare circuit 1606 asserts its output only when Hrep exceeds 9.5 mA, compare circuit 1508 asserts its output only when Lrep exceeds 9.5 mA, compare circuit 1510 asserts its output only when Lrep exceeds 5.0 mA and compare circuit 1612 asserts its output only one Hrep exceeds 5.0 mA.

The outputs of compare circuits 1602-1612 are provided as inputs to AND gates 1614-1618 as shown. The inputs to AND gate 1616 are inverted. The outputs of AND gates 1616 and 1618 are provided as inputs to AND gate 1620. The outputs of AND gates 1614 and 1620 are provided as inputs to OR gate 1622. The output of OR gate 1622 and delta comparator 1302 are provided as inputs to AND gate 1504. The delta comparator 1302 shown in FIG. 16 operates the same as the delta comparator 1302 shown in FIG. 13. Ultimately the output of AND gate 1504 is used by signal selector 304 to select Hrep or Lrep for subsequent decoding to generate WS1. When AND gate 1504 asserts its output, threshold detector 306 decodes Hrep to produce WS1. Otherwise threshold detector 306 decodes Lrep to produce WS1. FIG. 14 compares the outputs of threshold compare circuits 306 of FIGS. 13 and 15. As can be seen in this comparison, the output of threshold compare circuit 306 of FIG. 15 remains accurate after ABS controller 114 inadvertently activates redundant high side current monitor 202R at t=t1.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
 transmitting a first current to a wheel speed sensor;
 receiving a second current from the wheel speed sensor;
 generating a wheel speed signal for output based on one of the first current or the second current, wherein the wheel speed signal relates to a speed of a wheel that is associated with the wheel speed sensor;
 wherein the wheel speed signal is generated based on the second current if magnitudes of the first and second currents exceed a first predetermined value, or if the magnitudes of the first and second currents exceed a second predetermined value while the first predetermined value exceeds the magnitudes of the first and second currents;
 wherein the wheel speed signal is generated based on the first current if the first predetermined value exceeds the magnitude of the second current, or if the second predetermined value exceeds the magnitude of the second current.

2. The method of claim 1 further comprising:
 directly or indirectly comparing magnitudes of the first and second currents to the first predetermined value to determine whether the magnitudes of the first and second currents exceed the first predetermined value;
 directly or indirectly comparing magnitudes of the first and second currents to determine whether the magnitudes of the first and second currents exceed the second predetermined value.

3. The method of claim 1 further comprising:
 setting a signal to a first state if the magnitudes of the first and second currents exceed the first predetermined value, or if the magnitudes of the first and second currents exceed the second predetermined value while the first predetermined value exceeds the magnitudes of the first and second currents;
 setting the signal to a second state if the first predetermined value exceeds the magnitude of the second current, or if the second predetermined value exceeds the magnitude of the second current.

4. The method of claim 1, further comprising:
 directly or indirectly comparing the magnitudes of the first and second currents;
 wherein the wheel speed signal is generated based on the first current if the magnitude of the second current exceeds the magnitude of the first current by a predetermined amount.

5. The method of claim 4 further comprising:
 setting a signal to a first state if the magnitude of the first current exceeds the magnitude of the second current by the predetermined amount;
 setting the signal to a second state if the magnitude of the first current does not exceed the magnitude of the second current by the predetermined amount.

6. The method of claim 1:
 wherein the first current changes as teeth of a rotor pass the wheel speed sensor;
 wherein the second current changes as teeth of the rotor pass the wheel speed sensor.

7. The method of claim 2 further comprising:
 generating a first voltage based on the first current, wherein a magnitude of the first voltage is directly proportional to the magnitude of the first current;

generating a second voltage based on the second current, wherein a magnitude of the second voltage is directly proportional to the magnitude of the second current;

wherein the directly or indirectly comparing the magnitudes of the first and second currents to the first predetermined value comprises comparing the magnitudes of the first and second voltages to the first predetermined value;

wherein the directly or indirectly comparing the magnitudes of the first and second currents to the second predetermined value comprises comparing the first and second voltages to the second predetermined value.

8. An apparatus comprising:
a first circuit for transmitting a first current to a wheel speed sensor;
a second circuit for receiving a second current from the wheel speed sensor;
a circuit for generating a wheel speed signal for output based on the first current or the second current, wherein the wheel speed signal relates to a speed of a wheel that is associated with the wheel speed sensor;
wherein the circuit generates the wheel speed signal based on the second current if the magnitudes of the first and second currents exceed a first predetermined value, or if the magnitudes of the first and second currents exceed a second predetermined value while the first predetermined value exceeds the magnitudes of the first and second currents;
wherein the circuit generates the wheel speed signal based on the first current if the first predetermined value exceeds the magnitude of the second current, or if the second predetermined value exceeds the magnitude of the second current.

9. The apparatus of claim 8 further comprising:
a pair of first comparator circuits for directly or indirectly comparing magnitudes of the first and second currents, respectively, to the first predetermined value;
a pair of second comparator circuits for directly or indirectly comparing magnitudes of the first and second currents, respectively, to a second predetermined value;
wherein the circuit is coupled to and configured to receive output signals from the pair of first comparator circuits and from the pair of second comparator circuits.

10. The apparatus of claim 8 wherein the circuit is further configured to:
set a signal to a first state if the magnitudes of the first and second currents exceed the first predetermined value, or if the magnitudes of the first and second currents exceed the second predetermined value while the first predetermined value exceeds the magnitudes of the first and second currents;
set the signal to a second state if the first predetermined value exceeds the magnitude of the second current, or if the second predetermined value exceeds the magnitude of the second current.

11. The apparatus of claim 8 wherein the wheel speed signal is generated based on the first current if the magnitude of the second current exceeds the magnitude of the first current by predetermined amount.

12. The apparatus of claim 11:
wherein the circuit is configured to set a signal to a first state if the magnitude of the first current is greater than the magnitude of the second current by the predetermined amount;

wherein the circuit is configured to set a signal to a second state if the magnitude of the first current is not greater than the magnitude of the second current by the predetermined amount.

13. The apparatus of claim 8 further comprising the wheel speed sensor, wherein the wheel speed sensor is configured to vary the first and second currents as teeth of a rotor pass the wheel speed sensor.

14. The apparatus of claim 9:
wherein the circuit is further configured to generate a first voltage based on the first current, wherein a magnitude of the first voltage is directly proportional to the magnitude of the first current;
wherein the circuit is further configured to generate a second voltage based on the second current, wherein a magnitude of the second voltage is directly proportional to the magnitude of the second current;
wherein the circuit compares the magnitudes of the first and second currents to the first predetermined value by comparing the magnitudes of the first and second voltages to the first predetermined value;
wherein the circuit compares the magnitudes of the first and second currents to the second predetermined value by comparing the magnitudes of the first and second voltages to the second predetermined value.

15. An apparatus comprising:
a first circuit for transmitting a first current to a wheel speed sensor;
a second circuit for receiving a second current from the wheel speed sensor;
a circuit coupled to the first and second circuits and configured to detect and respond to a near zero resistive short between the wheel speed sensor and ground, wherein the circuit is configured to detect the near zero resistive short based on a direct or indirect comparison between magnitudes of the first and second currents to a first predetermined value, and based on a direct or indirect comparison between magnitudes of the first and second currents to a second predetermined value;
wherein the circuit is configured to generate a wheel speed signal for output based on the first current or the second current, wherein the wheel speed signal relates to a speed of a wheel that is associated with the wheel speed sensor,
the circuit generates the wheel speed signal based on the second current if the magnitudes of the first and second currents exceed a first predetermined value, or if the magnitudes of the first and second currents exceed a second predetermined value while the first predetermined value exceeds the magnitudes of the first and second currents, and
the circuit generates the wheel speed signal based on the first current if the first predetermined value exceeds the magnitude of the second current, or if the second predetermined value exceeds the magnitude of the second current.

16. The apparatus of claim 15:
wherein the circuit is configured to directly or indirectly compares magnitudes of the first and second currents to the first predetermined value to determine whether the magnitudes of the first and second currents exceed the first predetermined value;
wherein the circuit is configured to directly or indirectly compares magnitudes of the first and second currents to determine whether the magnitudes of the first and second currents exceed the second predetermined value.

17. The apparatus of claim 16:
- wherein the circuit is configured to set a signal to a first state if the magnitudes of the first and second currents exceed the first predetermined value, or if the magnitudes of the first and second currents exceed the second predetermined value while the first predetermined value exceeds the magnitudes of the first and second currents;
- wherein the circuit is configured to set the signal to a second state if the first predetermined value exceeds the magnitude of the second current, or if the second predetermined value exceeds the magnitude of the second current.

18. The apparatus of claim 17 further comprising the wheel speed sensor, wherein the wheel speed sensor is configured to vary the first and second currents as teeth of a rotor pass the wheel speed sensor.

\* \* \* \* \*